United States Patent
Dunn

(10) Patent No.: US 7,238,286 B2
(45) Date of Patent: Jul. 3, 2007

(54) COMBINATION TRICKLING FILTER AND OVERFLOW TANK FOR SECONDARY TREATMENT OF WASTEWATER, AND ASSOCIATED METHOD OF MANAGING WASTEWATER OVERFLOW

(76) Inventor: Scott Dunn, 2641 Summit St., Bethel Park, PA (US) 15102

( * ) Notice: Subject to any disclaimer, the term of this patent is extended or adjusted under 35 U.S.C. 154(b) by 66 days.

(21) Appl. No.: 11/121,220

(22) Filed: May 3, 2005

(65) Prior Publication Data

US 2006/0249452 A1     Nov. 9, 2006

(51) Int. Cl.
*C02F 3/04*     (2006.01)
(52) U.S. Cl. ........................ 210/617; 210/150
(58) Field of Classification Search ............ 210/615, 210/617, 618, 150, 151
See application file for complete search history.

(56) References Cited

U.S. PATENT DOCUMENTS

| | | | | |
|---|---|---|---|---|
| 2,065,123 A | * | 12/1936 | Downes ..................... | 210/617 |
| 2,340,842 A | * | 2/1944 | Reybold et al. ............ | 210/151 |
| 2,366,917 A | | 1/1945 | Levine | |
| 2,388,795 A | * | 11/1945 | Montgomery et al. ...... | 210/617 |
| 2,439,764 A | * | 4/1948 | Walker ...................... | 210/151 |
| 2,444,682 A | | 7/1948 | Smith | |
| 2,463,464 A | * | 3/1949 | Lind ........................ | 210/150 |
| 4,303,527 A | | 12/1981 | Reimann et al. | |
| 4,387,020 A | | 6/1983 | Hill | |
| 4,892,440 A | | 1/1990 | Regan | |
| 5,096,588 A | * | 3/1992 | Albertson ................... | 210/617 |
| 5,249,887 A | | 10/1993 | Phillips | |
| 6,837,994 B2 | | 1/2005 | Izawa | |

OTHER PUBLICATIONS

Steel and McGhee, Water Supply and Sewerage, 1979, p. 492.*

* cited by examiner

*Primary Examiner*—Christopher Upton
(74) *Attorney, Agent, or Firm*—Debra Z. Anderson; Meyer, Unkovic & Scott LLP

(57) ABSTRACT

A method and apparatus for controlling water flow in a wastewater treatment plant is provided. The method comprises the steps of providing a trickling filter effluent water basin having filter media provided over a storage space for water. Water outlet flow from the basin is controlled via a flow weir or other suitable structure, thereby enabling the trickling filter effluent water basin to fill with water and store water when desired. Such storage is particularly useful during wet weather and/or overflow events. A trickling filter effluent basin modified so as to accommodate water storage and methods of modifying existing trickling filter effluent basins are also provided.

8 Claims, 9 Drawing Sheets

COMBINATION TRICKLING FILTER AND OVERFLOW TANK FOR SECONDARY TREATMENT OF WASTEWATER, AND ASSOCIATED METHOD OF MANAGING WASTEWATER OVERFLOW

FIELD OF THE INVENTION

The present invention provides a method and apparatus for in-plant control, containment and management of wet weather overflow in a wastewater treatment plant (WWTP). Specifically, modified trickling filter tanks are used as holding tanks during wet weather events.

BACKGROUND INFORMATION

Combined sewer systems are sewers that are designed to collect rainwater runoff, domestic sewage and industrial wastewater in the same pipe. Most of the time, combined sewer systems transport all of their wastewater to a wastewater treatment plant, where it is treated and then discharged to a water body. During periods of heavy rainfall or snowmelt, however, the wastewater volume in a combined sewer system can exceed the capacity of the sewer system or treatment plant. Thus, combined sewer systems are designed to overflow occasionally and discharge excess wastewater directly to nearby streams, rivers or other waterways.

The overflows, called combined sewer overflows (CSOs), contain not only stormwater but also untreated human and industrial waste, toxic materials and debris. Overflows are a major source of water pollution in communities with combined sewer systems.

The problems related to overflow and infiltration of untreated water into sewer systems also occur in closed (non-CSO or separate) wastewater systems. Due to deteriorating collection systems and illegal cross-connections, discharge of untreated wastewater is a common occurrence in closed systems as well. Excess flows in either system can take the form of infiltration into the system due to cracked pipes, offset pipe joints, and the like, or direct inflow into the system, such as with direct surface water connections, foundation drains, and the like.

The costs of remedying the wet weather overflow problem are not insignificant. In Pennsylvania alone, it was estimated in 2001 that over $4 billion would be needed to bring wastewater discharge into compliance with state and national water quality standards. Estimates of the repair costs for wastewater and drinking water systems statewide in Pennsylvania exceed $11 billion dollars.

One method of managing wet weather overflows is to build overflow tanks positioned outside the wastewater treatment plant, before the wastewater point of entry into the plant. When the flow rate into the plant is heavy, wastewater is diverted into the overflow tank(s), and the water is stored in the tank until levels within the plant subside and the plant can accommodate the additional flow. A problem with this method is that overflow tanks are very expensive to build. For example, the cost of building a 700,000 gallon capacity tank in 2005 is about $3.1 million dollars. Additionally, if the capacity of the overflow tank is exceeded, wastewater is diverted to surface waterways, bypassing the treatment process and degrading the water quality of the waterway. Most methods of control aimed at increasing the capacity of the plant are very expensive and are land intensive.

There remains a need for a cost-effective solution to the problem of reducing and managing wet weather overflow in the wastewater treatment process so that water discharged to surface waters meets the applicable state and national water quality standards.

SUMMARY OF THE INVENTION

Accordingly, in one aspect, the present invention provides a method of controlling water flow in a wastewater treatment plant, the method comprising the steps of: (a) providing a trickling filter effluent water basin having filter media provided over a storage space for water and a flow control assembly for controlling outlet flow from the basin; and (b) controlling outlet flow from the basin, thereby enabling the trickling filter effluent water basin to fill with water and store water. The water basin is used to store water during overflow events. In step (b), the water basin is permitted to fill with water by reducing the flow of water out of the basin after influent water has contacted filter media. In one embodiment, the flow control assembly is a flow weir in combination with a flow restriction valve. In another embodiment, the flow control assembly is a weir gate.

The basin further includes a support platform containing filter media, the support platform positioned at a height above a base of the basin. The water basin is permitted to fill with water to a predetermined level below the height of the support platform containing the filter media. When desired, the stored water is released from the water basin and further processed within the wastewater treatment plant, such as by any one or more of the steps of clarification, filtration and/or disinfection.

In an additional aspect, the present invention provides a trickling filter effluent water basin comprising: a) a retaining wall; b) a support platform to support filter media at a height to provide storage space for water below the platform; c) an outlet pipe in fluid communication with the storage space; d) a flow control box in fluid communication with the outlet pipe and the storage space, the flow control box having an elevation extending above the outlet pipe; and e) a flow control assembly for controlling flow, received within the flow control box, which permits water to be contained in the storage space upstream of the flow control assembly. The outlet pipe positioned downstream of the flow control box.

In one embodiment, the flow control assembly is a flow weir in combination with a flow restriction valve. In another embodiment, the flow control assembly is a weir gate.

Optionally, the water basin can further comprise one or more ventilation ports defined in the retaining wall, and optionally include a compressor in fluid communication with the storage space to provide additional ventilation to the basin.

In yet an additional aspect, the present invention provides a method for modifying a trickling filter water effluent basin having a retaining wall, filter media and a support platform to support the filter media, the method comprising the steps of: a) providing an extension to the retaining wall to increase a height of the wall; b) elevating the support platform to provide a storage space for water under the platform; c) providing a flow control assembly to control water height in the storage space upstream of the means for controlling flow; and d) providing an elevated flow control box to receive the flow control assembly.

The method can optionally further include the step of providing a ventilation port or a forced air blower in the retaining wall, the port or blower in fluid communication with the storage space.

In an additional aspect, the present invention provides a trickling filter effluent basin for use in filtering water comprising: (a) a primary retaining wall defining a receptacle area having a floor; (b) filter media provided within the receptacle area on a support platform at a height above the floor; (c) a secondary retaining wall positioned adjacent to the primary retaining wall; (d) a plurality of passageways defined in the primary retaining wall; (e) an underdrain channel defined between the primary retaining wall and the secondary retaining wall; (f) a flow control assembly for controlling flow received in the underdrain channel; and (g) an outlet pipe positioned downstream of the flow control assembly; whereby when water is pumped into the basin, the water flows over the media to the floor of the receptacle area, through the passageways into the underdrain channel and through the outlet pipe out of the basin.

In a further aspect, the present invention provides a trickling filter effluent basin for use in filtering water comprising: (a) a primary retaining wall defining a receptacle area having a floor; (b) filter media provided within the receptacle area on a support platform at a height above the floor; (c) a secondary retaining wall positioned adjacent to the primary retaining wall; (d) an interior underdrain channel in the floor of the receptacle; (e) an exterior underdrain channel in fluid communication with the interior underdrain channel and defined between the primary retaining wall and the secondary retaining wall; (f) a flow control assembly received in the underdrain channel; and (g) an outlet pipe positioned downstream of the flow control assembly; whereby when water is pumped into the basin, the water flows over the media to the floor of the receptacle area into the interior underdrain channel, out of the basin into the exterior underdrain channel and through the outlet pipe out of the basin.

The present invention provides a cost-effective solution to the above problem. By modifying existing trickling filter tanks or building new tanks with a dual purpose, the cost of building expensive overflow tanks is avoided. Additionally, overflow water is contained within the plant and is processed and treated prior to release to surface waters. The tanks can also be used to store water for plant operation and maintenance activities. As will be understood by one skilled in the art, the present invention can be used for both municipal and industrial wastewater treatment systems.

The present invention offers additional advantages. No major changes in piping are required to implement the dual-purpose trickling filter tank, and it is easy to operate. Aeration can be added to the primary trickling filter basin to aid in reduction of biological oxygen demand (BOD) during seasonal weather changes, and the basin of a secondary trickling filter can be used for flocculation prior to final clarification.

BRIEF DESCRIPTION OF THE DRAWINGS

The invention is further illustrated by the following drawings in which:

FIGS. 13(a) and 13(b) are end elevation views of a gate valve shown in FIG. 12, wherein FIG. 13(a) shows the open position and FIG. 13(b) shows the closed position.

DETAILED DESCRIPTION OF PREFERRED EMBODIMENTS

As used herein, the term "overflow event" refers to any event which causes the inlet pipes to the wastewater treatment plant to surcharge and/or overflow, such as during heavy rains, snowmelt or other wet weather fluctuations in water. Overflow events include those events which cause the flow entering the WWTP to exceed permitted design averages and/or peak permitted flows. Such events may cause excess flows to be discharged from the WWTP untreated and/or cause hydraulic and/or organic overloads of existing treatment facilities.

In all figures, like numerals refer to like features having the same described function.

The terms "trickling filter effluent water basin", "trickling filter tank", "trickling filter biotower" and "trickling filter" are used herein interchangeably and refer to a wastewater treatment tank in which water flows downward over biological media to remove soluble organic contaminants in the water, as is known in the art. Such tanks are used in both municipal and industrial wastewater treatment systems. As will be understood by one skilled in the art, any of the embodiments described herein can be used in either setting.

Figure 1:
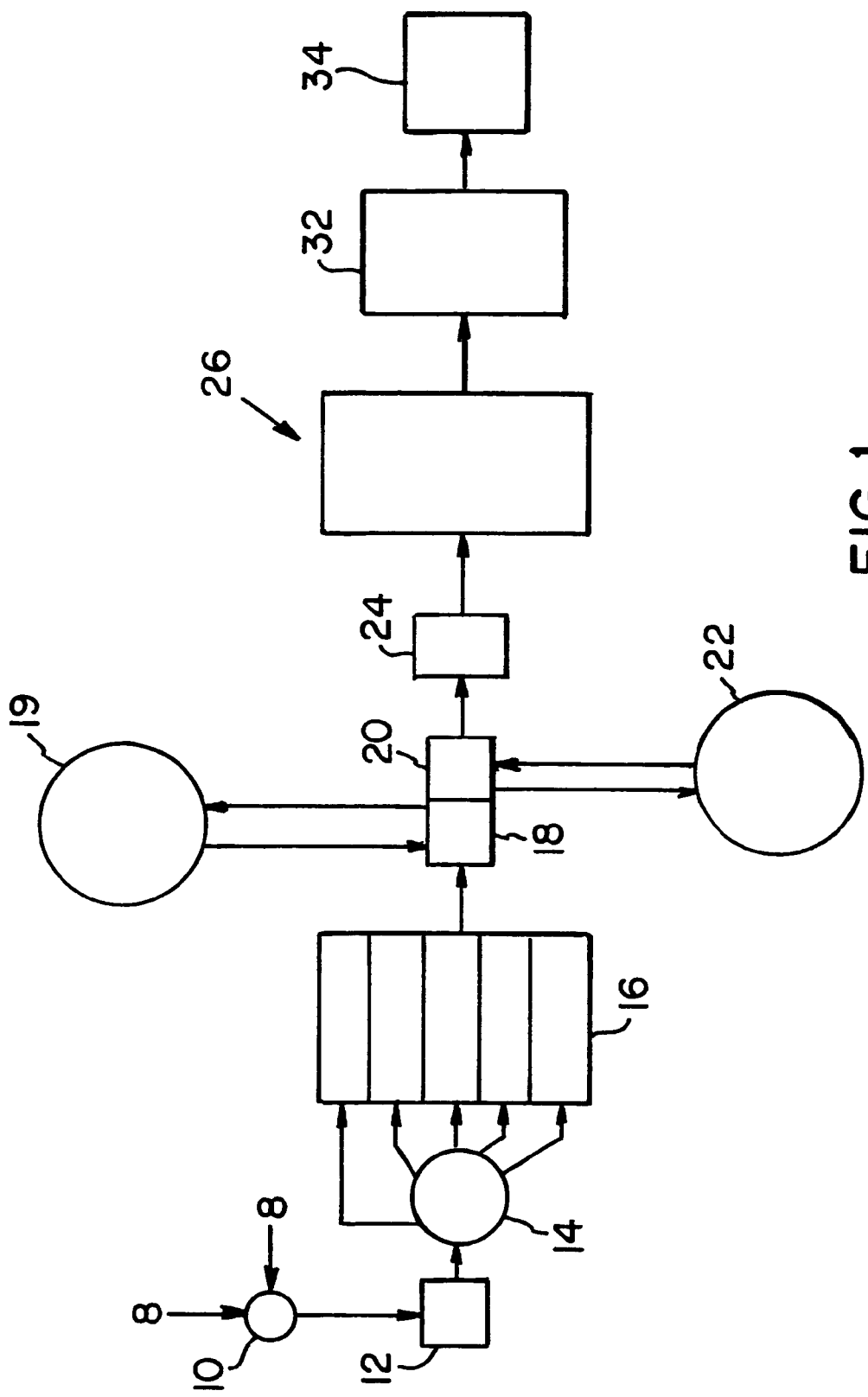
FIG. 1 is a prior art schematic diagram of water flow through a wastewater treatment plant.

FIG. 1 shows a schematic diagram of the flow of wastewater through a typical prior art wastewater treatment plant. Wastewater 8 enters the influent manhole and gate valve 10 and flows to a raw sewage wet well 12. The wastewater is then pumped to a primary clarifier distribution box 14 and flows into primary clarifiers 16 for separation of solids from the flow. The water is pumped to a primary trickling filter wet well 18 and then pumped to a primary trickling filter 19, for removal of biological material from the water. Effluent from the primary trickling filter 19 then flows to a secondary trickling filter wet well 20 and is pumped to a secondary trickling filter 22, after which it enters a secondary clarifier distribution box 24 and then a secondary or final clarifier 26. Following secondary clarification, the water flows to a disinfection facility 32 where the water is disinfected through the use of chlorine, hypochlorite, ultraviolet light or other processes, after which the outflow is directed to surface waters 34. As will be understood by one skilled in the art, numerous modifications to the above process are often made, depending on the type of wastewater being treated and other considerations. For example, some plants may have tertiary treatment after the secondary clarifiers, in which water would either flow or be pumped onto sand filters for removal of any extra fine suspended solids.

Figure 2:
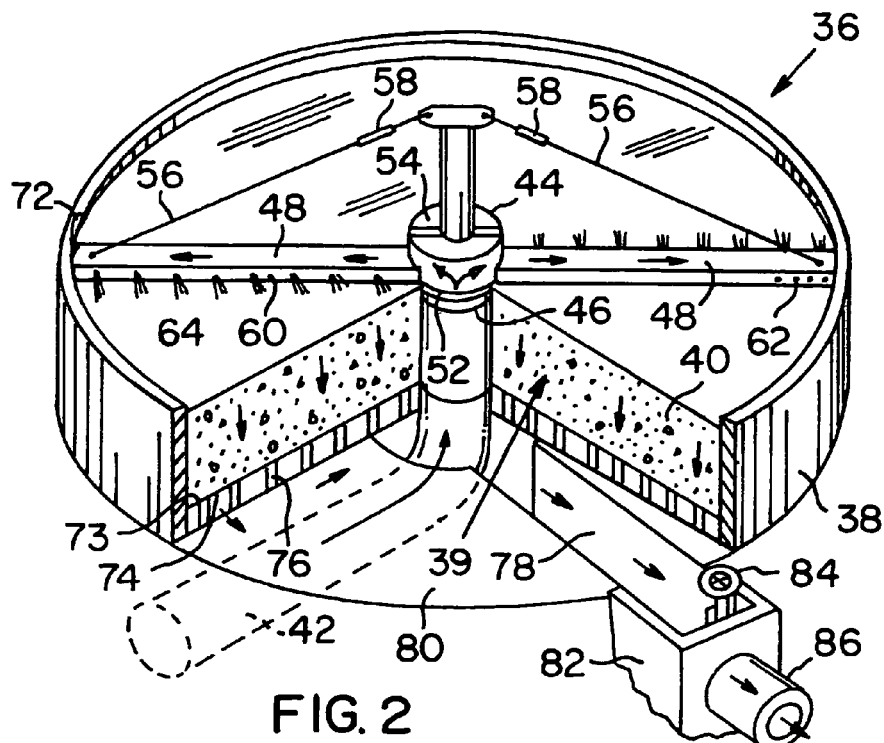
FIG. 2 is a top perspective, partially in section, view of a typical prior art trickling filter effluent water basin with rock media.

Referring now to FIG. 2, a prior art trickling filter tank 36 with retaining wall 38, receptacle area 39 holding the rock filter media 40 is shown. The filter media provides a large surface area upon which the biological slime growth develops. An inlet pipe 42 conveys wastewater to be treated to a trickling filter distributor 44 having a distributor base 46 to support rotating distributor arms 48 and distributor bearings 52 which allow the distributor arms 48 to rotate. The distributor 44 contains a center well 54 which provides for higher water head to maintain equal flow to distributor arms 48.

Stay rods 56 support the distributor arms 48 and turnbuckles 58 on the stay rods 56 permit adjusting and leveling of the distributor arms 48 to produce an even distribution of wastewater over the filter media 40. The speed of the distributor arms 48 is controlled with the speed retarder orifice 62 or with other means such as a mechanical driver.

Wastewater flows through the inlet pipe 42 and is pumped up through the center well 54 of the distributor 44, through the distributor arms 48 and over the filter media 40 via outlet orifices 64 which control the flow of water to the filter media 40. Outlet orifices 64 are adjustable to provide an even distribution of wastewater to each square foot of filter media 40. Splash plates 60 on the distributor arms 48 distribute the flow from the outlet orifices 64 evenly over the filter media 40.

An arm dump gate 72 drains the distributor arms 48 and controls filter flies along the filter retaining wall 38. The dump gate 72 is also used for flushing the distributor arms 48 to remove accumulated debris that could block the outlet orifices 64.

In trickling filter systems with rock media, the media rests on a bottom 73 of the tank on a support grill 74 which lays directly on top of the underdrainage system 76. The support grill 74 holds the filter media 40 in place and keeps it out of the underdrainage system 76. The underdrainage system 76 is a network of pipes made of clay directly beneath the media support grill 74. As will be understood by one skilled in the art, the underdrainage system in a trickling filter tank with rock media cannot store water, nor can it be adapted to do so. After the wastewater flows over the filter media 40, it falls to the underdrainage system 76 where it is conveyed to an underdrain channel 78 via a sloped floor 80. The underdrain channel 78 drains filter effluent to an outlet box 82, where it is collected before it flows to the next step in the wastewater treatment process. An outlet valve 84 in outlet box 82 is used for maintenance and is placed at the outlet pipe 86. In rock media systems, the outlet valve is normally in the open position but is closed when it becomes necessary to backwash the filter, such as when it becomes clogged.

Figure 3:
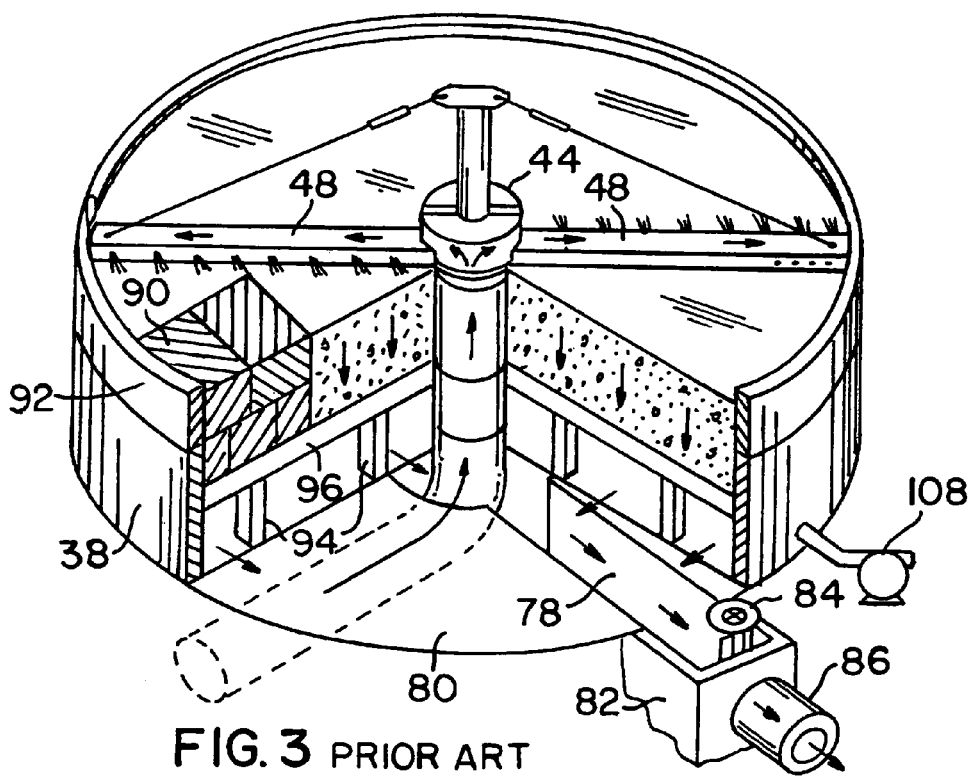
FIG. 3 is a top perspective, partially in section, view of another prior art trickling filter effluent water basin with newer plastic cross-flow block media.

FIG. 3 illustrates a prior art modern trickling filter tank in which old rock media has been replaced with plastic filter media 90 such as plastic cross flow block media. The modern tank functions as described above, with the following modifications as described below.

After wastewater flows over the plastic filter media 90, it falls to the floor where it is conveyed to an underdrain channel 78 via the sloped floor 80. The underdrain channel 78 drains filter effluent to an outlet box 82, where it may be collected before it flows to the next step in the wastewater treatment process. An outlet valve 84 at the outlet pipe 86 is used for maintenance purposes.

The height of the original retaining wall 38 may be extended with the addition of an extension wall 92 made of steel or other suitable material, for the purpose of adding additional media or providing a wind break to the media. A standard hydraulic flow-driven distributor (not shown) or a mechanical drive type of distributor 44 is used to control the speed of the distributor arms 48. Piers 94 made of concrete or other suitable material support cross-beams 96 made of concrete or other suitable material, which in turn support the plastic media 90 at a height of about one to three feet above the floor of the tank. The retaining wall 38 may contain one or more ventilation ports (not shown) or forced air blowers 108 below the level of the filter media 90, to allow air to flow to the filter media 90. In both the old rock media tank shown in FIG. 2 and the modern trickling filter tank shown in FIG. 3, the underdrain channel 78 and outlet pipe 86 are positioned below the bottom (floor level) of the tank, such that the top of the outlet box 82 is at ground level. Also in both prior art tanks shown in FIGS. 2 and 3, the outlet valve 84 is positioned at the downstream end of the outlet box 82 and directly on the outlet pipe 86.

Figure 4:
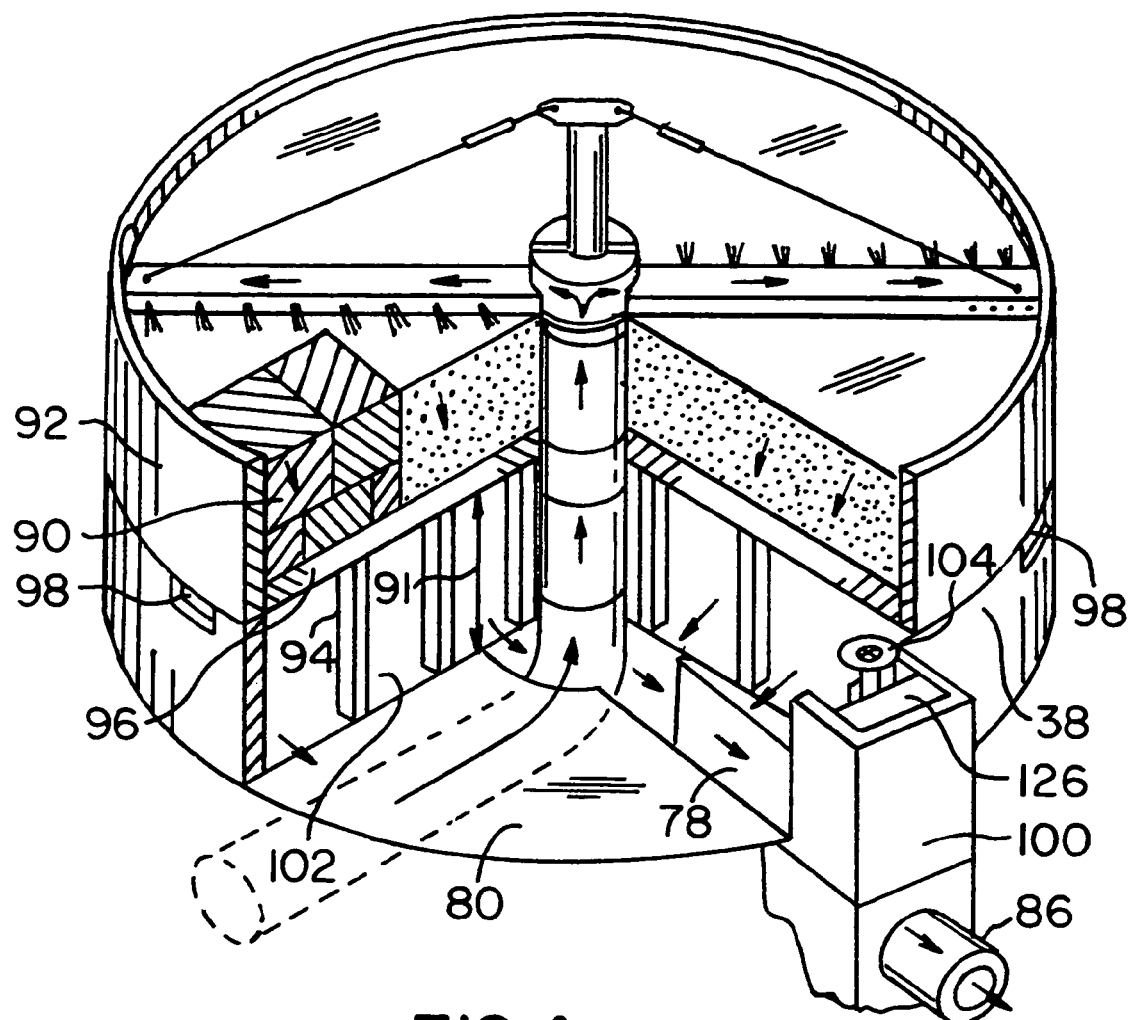
FIG. 4 is a top perspective, partially in section, view of the modified trickling filter effluent basin made in accordance with the present invention, during normal plant flow.

FIG. 4 shows an embodiment of the trickling filter made in accordance with the present invention. Water is distributed through the tank and over the media as generally described above. In one embodiment, an existing older rock media tank or an existing newer plastic media tank has been modified according to the present invention. The height of the original retaining wall 38 is extended with the addition of an extension wall 92 made of steel or other suitable material, to provide additional storage space for overflow water. The media support platform such as piers 94 made of concrete or other suitable material are extended in height above the floor 80 of the tank. The piers 94 and cross beams 96, also made of concrete or other suitable material, support the plastic media 90 at a height 91 of greater than about three feet above the floor 80 of the tank, preferably at least four feet or more above the floor 80 of the tank, more preferably about at least six or seven feet above the height of the floor 80. The extension wall 92 optionally contains one or more ventilation ports 98 below the level of the filter media 90 but above the high water level to allow air to flow through the filter media 90. Optionally, an air compressor or blower 108 in fluid communication with the storage area inside the tank may be used, also placed above the high water level during storage. During times of peak water storage, it may be necessary to use a blower to provide proper aeration of the filter media. Air can also be provided to the media by other means, such as ventilation pipes through the media from the top of the tank.

Figure 5:
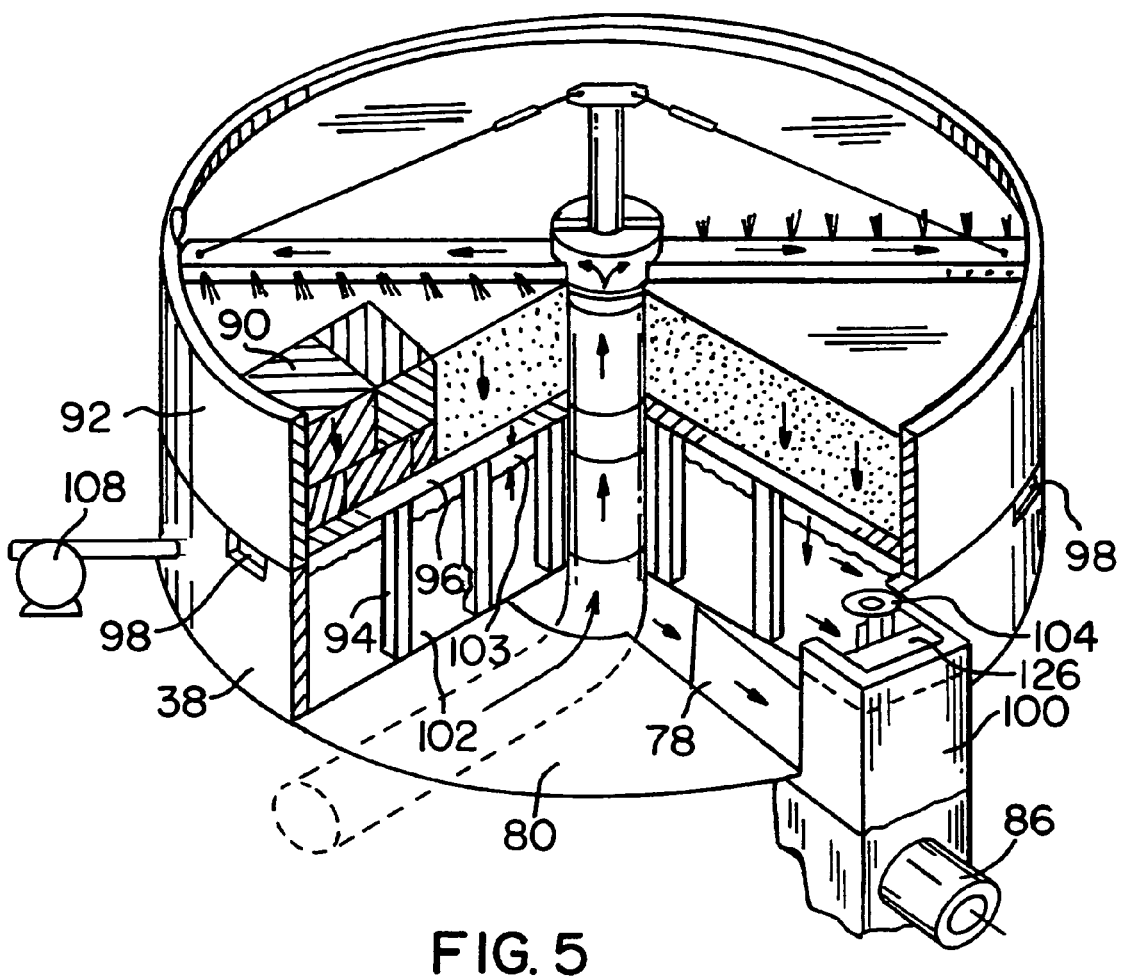
FIG. 5 is a top perspective, partially in section, view of the modified trickling filter effluent basin shown in FIG. 4 as used for wet weather storage.

The trickling filter tank of the present invention is further modified with the addition of a flow control box 100. The flow control box 100 extends the height of the prior art outlet box 82 to a height near the height of the support platform cross beams 96 containing the media 90. The flow control box 100 contains a flow control assembly to set the elevation of water retained in the tank when storage is needed, such as a flow weir 126 or other suitable structure in combination with a flow restriction valve or gate 104, or a weir gate (described herein below in reference to FIGS. 8, 9 and 14), as will be understood by one skilled in the art. The terms "flow restriction valve" and "gate" are used herein interchangeably and each term includes the other. Referring to FIG. 5, the flow weir 126 is adjustably sized at the maximum depth of the tank that will be used for storage (provided in interior storage space 102), such that when full, the tank still contains sufficient air space 103 below the media 90 for ventilation. The size of the air space can be anywhere from a few inches to a foot or more, depending on the type of media used and the amount of aeration required, as will be determined by one skilled in the art. Aeration of the media can also be accomplished by other methods, such as aeration pipes through the media from the top of the tank (not shown). The flow restriction valve 104 is disposed adjacent to the flow weir 126. During normal operation of the tank, water flows over the filter media 90 and falls to the floor 80 where it is conveyed to an underdrain channel 78 via a sloped floor 80. The flow restriction valve 104, which regulates flow of water out of the tank, is in the open position and water flows through the underdrain channel 78, through the flow control box 100, into the outlet pipe 86 and to the next stage of processing in the wastewater treatment plant.

In another embodiment, the trickling filter tank of the present invention is built as a new tank, incorporating all of the modifications described above, including elevating the support platform for the filter media, increasing the height of the flow control box and providing a flow control assembly such as a flow weir in combination with a flow restriction valve.

FIG. 5 illustrates an embodiment of a trickling filter tank of the present invention as used for storage. When storage is desired, such as during wet weather events, the flow restriction valve 104 is partially or substantially closed to restrict the flow of water through the outlet pipe 86. Filling up the interior storage space 102 can be achieved by temporarily increasing the flow at the head of the plant when the flow restriction valve 104 is being used. It is usually necessary to maintain a minimum level of water flow out of the tank to downstream processing steps. When flow is restricted, water accumulates in the interior storage space 102 of the tank to the level of the weir 126 and can be stored until further processing is desired. If the level of water exceeds the capacity of the interior storage space 102 it will flow over the weir 126 into the flow control box 100 and out of the tank through the outlet pipe 86. Water is released from storage by opening the flow control assembly, such as opening the flow restriction valve 104, as will be understood by one skilled in the art.

Figure 6:
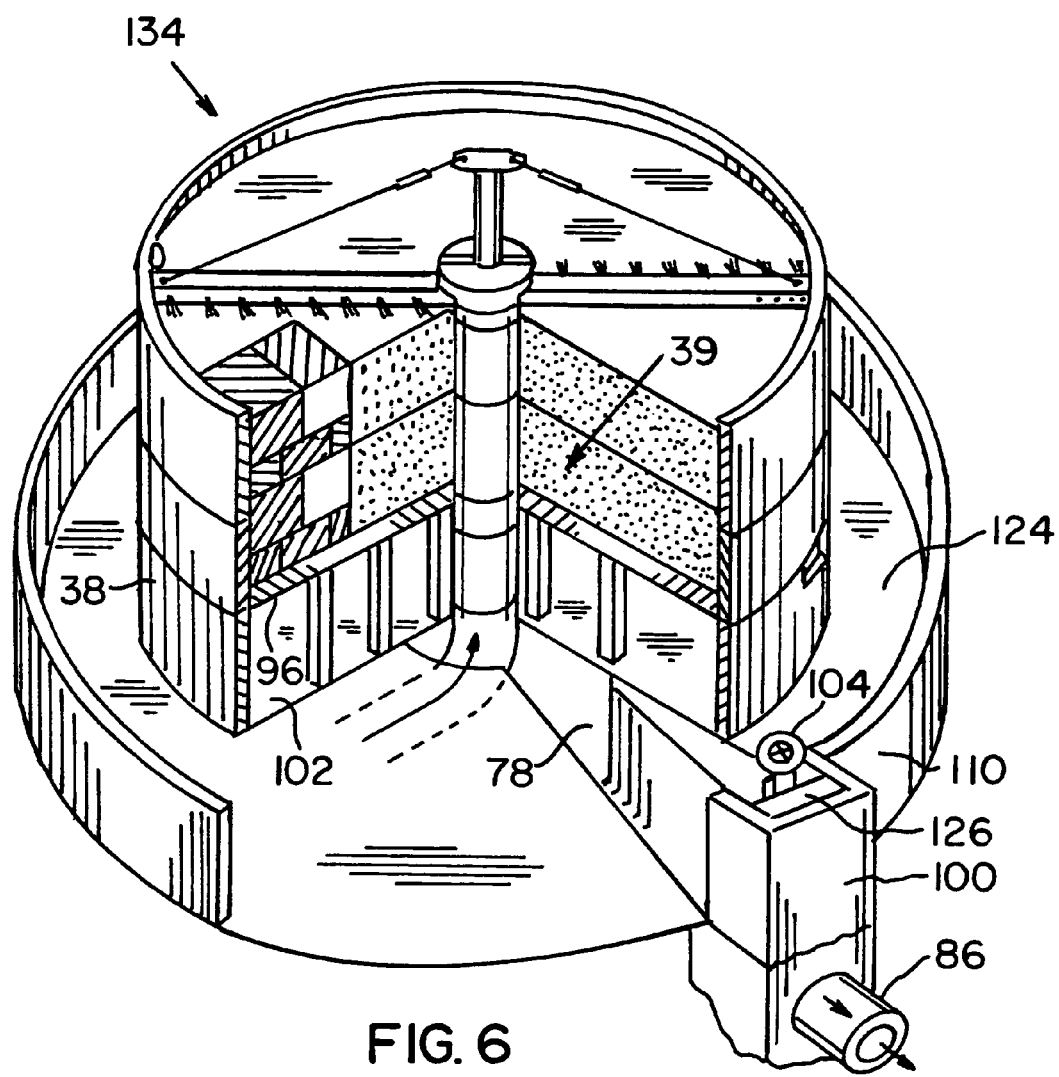
FIG. 6 is a top perspective, partially in section, view of another embodiment of the trickling filter effluent basin made in accordance with present invention having a peripheral wall surrounding the trickling filter tank for storage of water.

FIG. 6 illustrates an additional embodiment of the present invention, in which a peripheral wall 110 is built around a trickling filter tank 134 having a receptacle area 39 for the plastic filter media 90. Such a system would be desirable, for example, when the trickling filter tank is a newer model of tank such as a biotower, which is taller than standard tanks but of smaller diameter. Such a tank 134 would have less storage space for water in the interior storage space 102 under the media support platform as described above. In this situation, a peripheral wall 110 can be built around the tank 134 and provide additional external storage area 124 for water in the area between the retaining wall 38 of the tank 134 and the peripheral wall 110. The height of the peripheral wall 110 is a height lower than the support platform holding the media inside the tank 134. The underdrain channel 78 is extended past the outer wall of the tank to the new peripheral wall 110, and the flow control box 100 is placed at the outer peripheral wall 110. The flow control box 100 will have the flow control assembly as described above. In operation during a wet weather event, the flow restriction valve 104 in the flow control box 100 is closed, and both the interior storage space 102 under the support platform and the external storage area 124 fill with water to the desired level as set by the flow weir 126.

Figure 7:
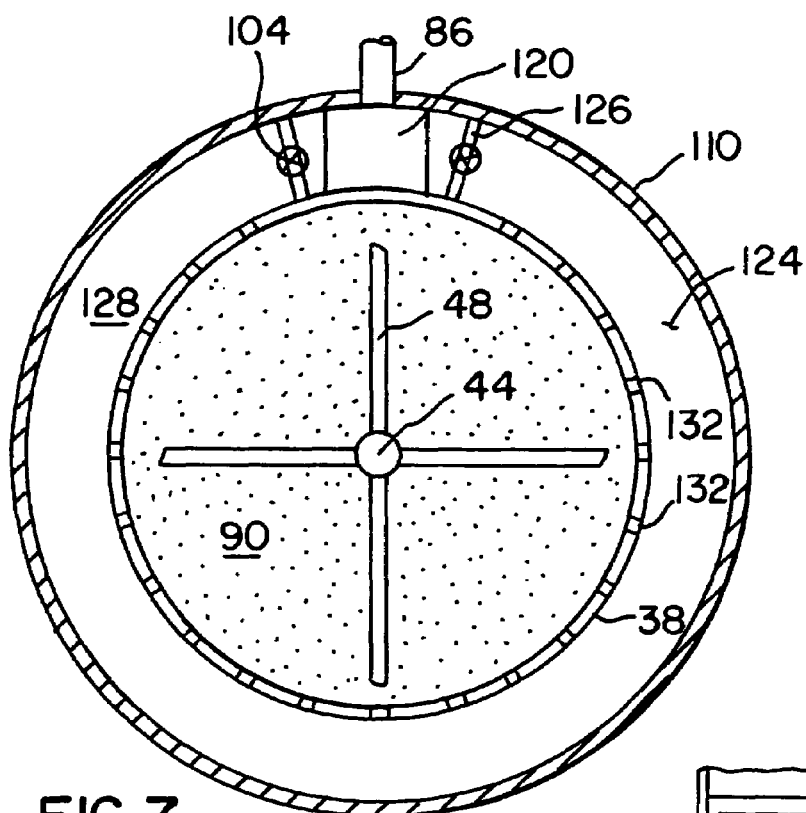
FIG. 7 is a top plan sectional view of another embodiment of the present invention, in which a weir and restriction valve or weir gate is placed on either side of an underdrain channel.

FIG. 7 illustrates a variant on the embodiment shown in FIG. 6, in which water is released from the tank through flow outlet holes 122 rather than the underdrain channel described above. The peripheral wall 110 provides an external storage area 124 for water, and the floor 128 (shown in FIG. 9 described below) of the external storage space 124 is sloped to direct water flow to the effluent drop zone 120, where it flows out through the outlet pipe 86. In this embodiment, the flow weir 126 and flow restriction valve 104 are placed on either side of the effluent drop zone 120.

Figure 8:
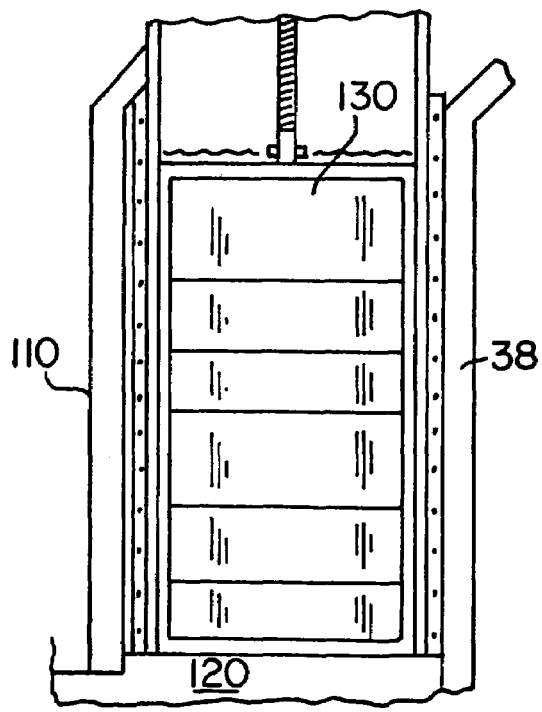
FIG. 8 depicts operation of the weir gate (illustrating the closed position) shown in FIG. 7.
Figure 9:
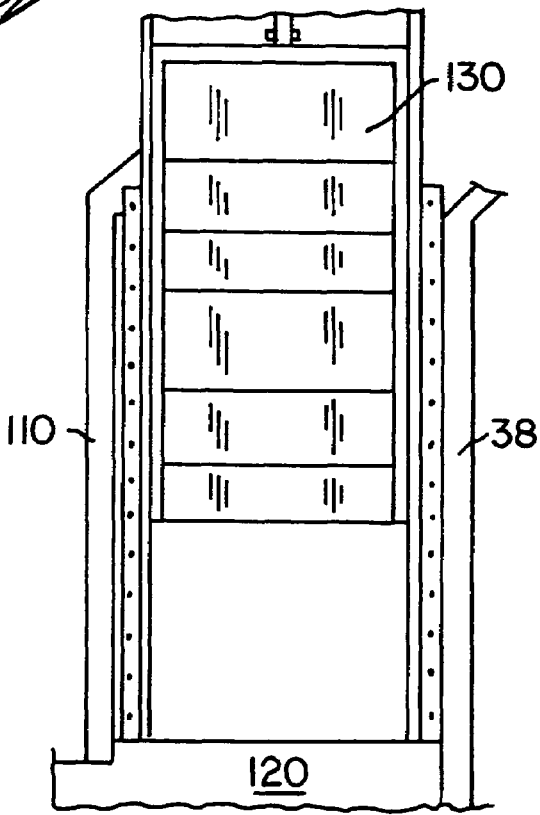
FIG. 9 depicts operation of the weir gate (illustrating the open position) shown in FIG. 7.

As will be understood by one skilled in the art, flow out of the tank or the external storage area in any of the embodiments described herein, including embodiments having a peripheral retaining wall, can be restricted up to the desired level by using, for example, a flow restriction valve or gate in combination with a flow weir of the desired height, or a weir gate, as that term is understood in the art. The weir gate functions to both set the level of water stored in the tank and control the flow of water out of the outlet pipe. Other suitable structures or combinations of structures can also be used, provided that they provide the desired functions of setting the storage water level and controlling flow out of the tank. A weir gate is shown in FIGS. 8 and 9 as used in the embodiment shown in FIG. 7. In FIG. 8, the weir gate 130 is in the closed position, and water is held in the external storage space 124 shown in FIG. 7. In FIG. 9 the weir gate 130 is in the open position and water flows from the external storage space 124 into the effluent drop zone 120 and out through the outlet pipe 86.

Figure 10:
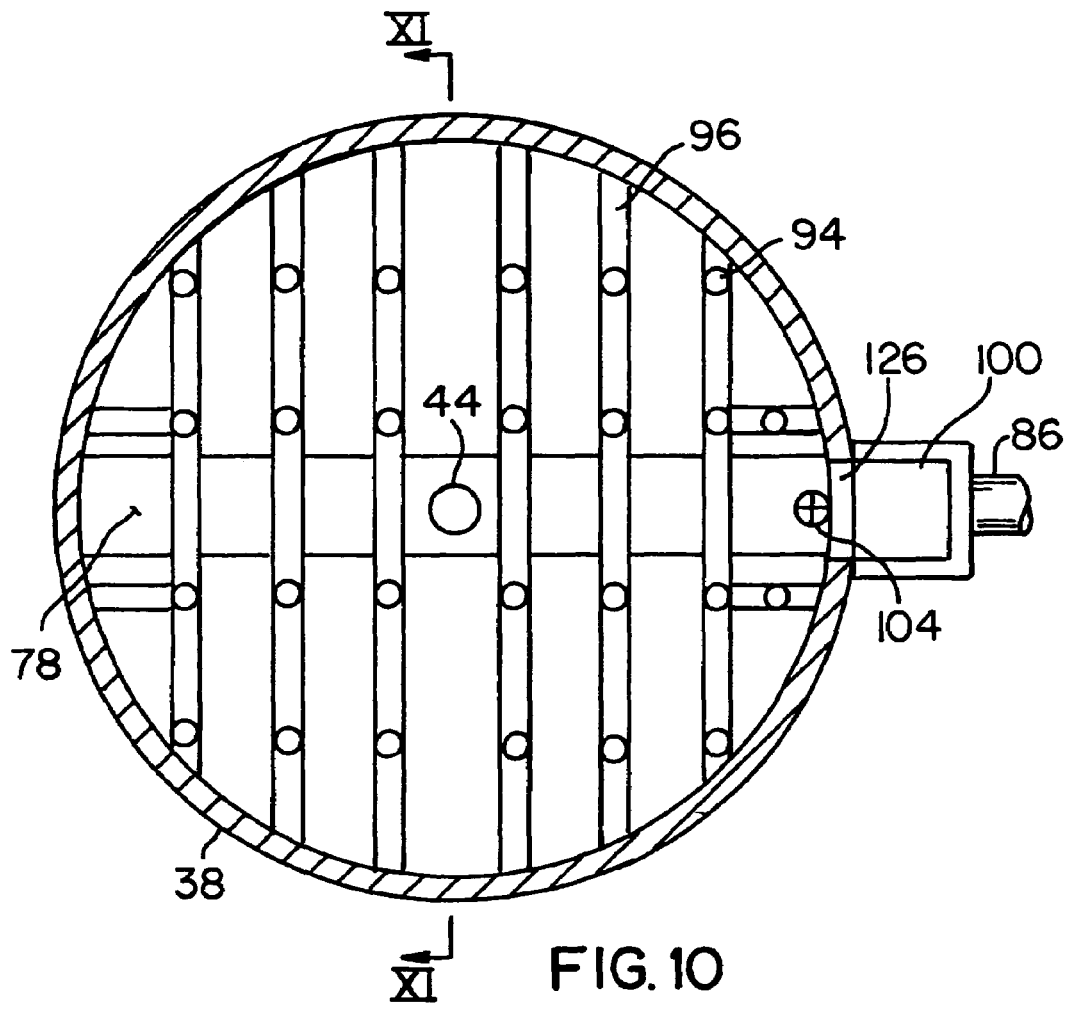
FIG. 10 is a top plan view of a portion of the embodiment shown in FIGS. 4 and 5 without filter media.
Figure 11:
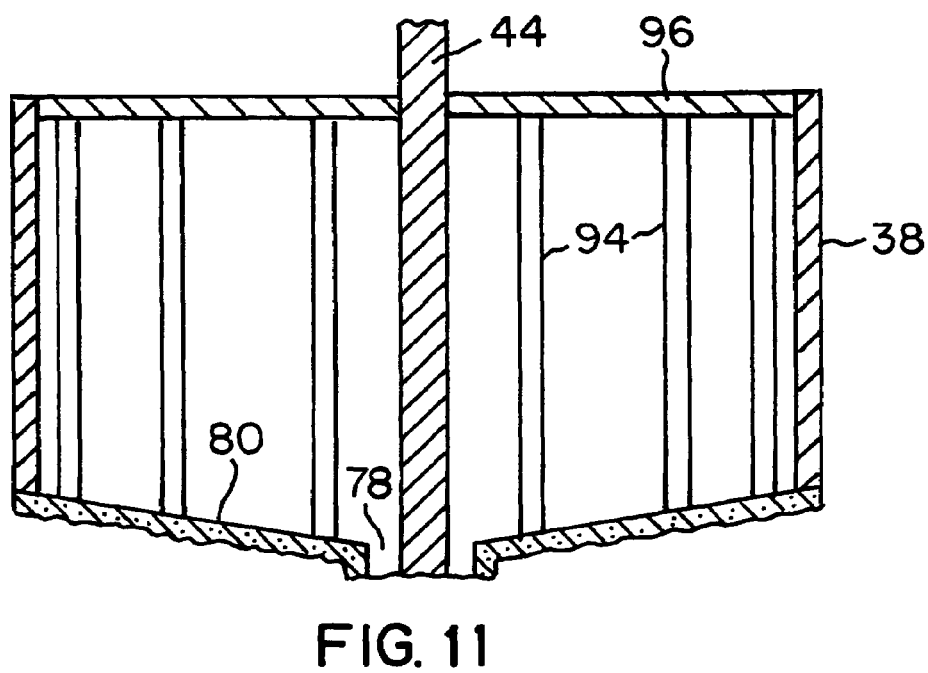
FIG. 11 is a cross sectional view of the embodiment shown in FIGS. 4 and 5 without filter media.

FIG. 10 is a top plan view of the embodiment shown in FIGS. 4 and 5 without filter media. The retaining wall 38 of the tank is shown, with the underdrain channel 78, the distributor 44, the media support piers 94 and the cross-beams 96. Also shown is the flow control box 100 having a flow restriction valve 104 and a flow weir 126. FIG. 11 is a cross-sectional view of the embodiment shown in FIGS. 4 and 5, also without filter media, illustrating the retaining wall 38, underdrain channel 78, distributor 44, the media support piers 94 and cross-beam 96.

Figure 12:
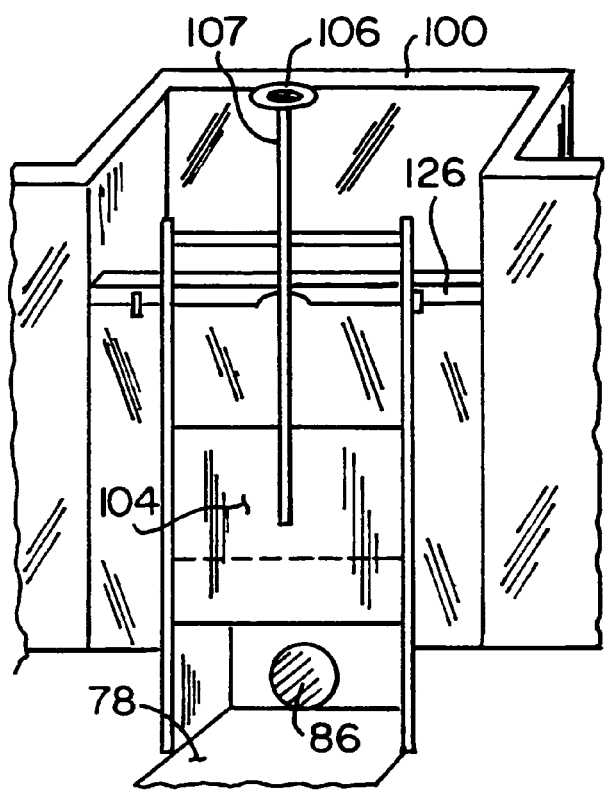
FIG. 12 is an end elevation view of a flow control box shown in FIGS. 4 and 5.

FIG. 12 is a view of the flow control box 100 as described above and shown in FIGS. 4, 5 and 6, illustrating the flow restriction valve 104, valve handle 106, drive shaft 107, flow weir 126, underdrain channel 78 and the outlet pipe 86. The handle 106 and drive shaft 107 are threadably mounted on the flow restriction valve 104 and rotate to permit raising and lowering of the valve.

Figure 13A:
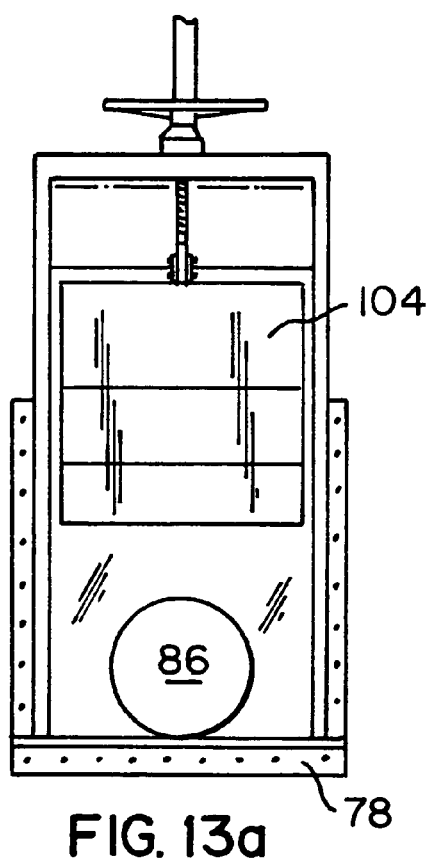
Figure 13B:
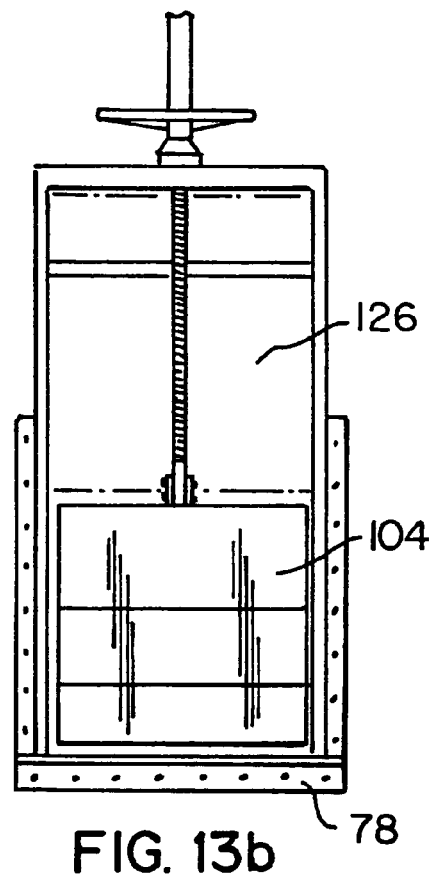
Figure 14A:
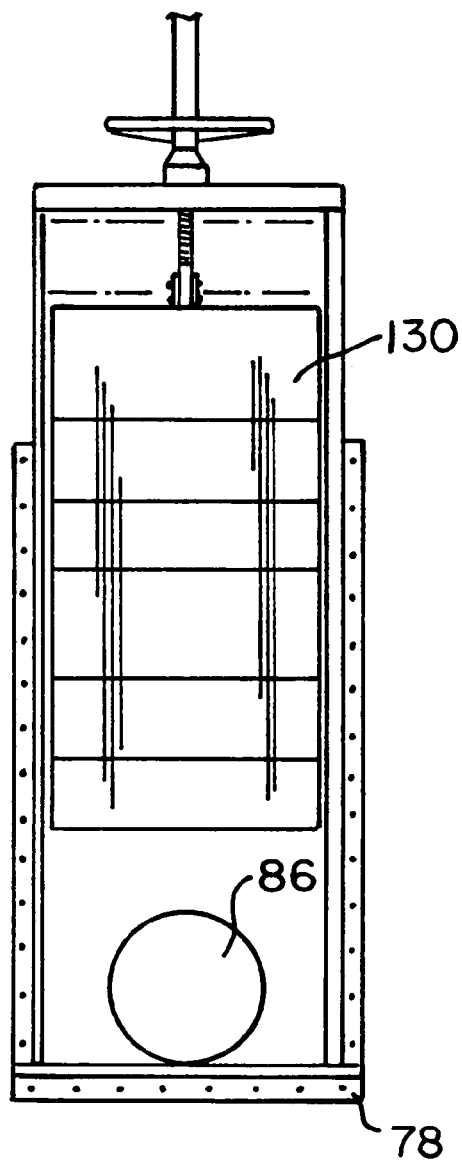
FIGS. 14 (a) and 14(b) are end elevation views of a flow control box shown in FIGS. 4 and 5 in which the gate valve and weir are combined in one structure, a weir gate, wherein in FIG. 14(a) the weir gate is in the open position and in FIG. 14(b) the weir gate is in the closed position.
Figure 14B:
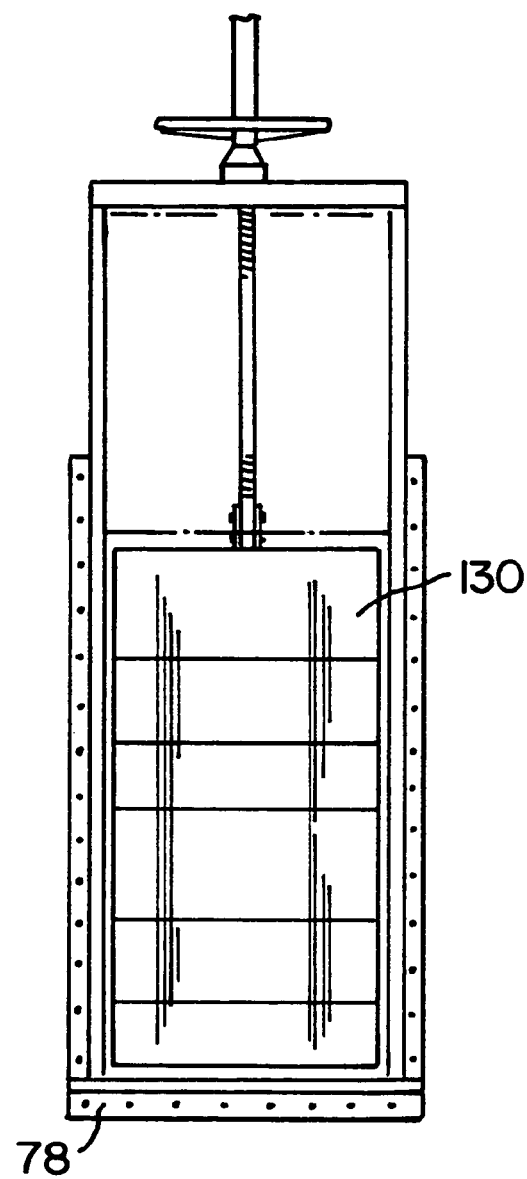

FIG. 13(a) shows the flow restriction valve 104 in the open position, allowing water from the underdrain channel 78 to flow through the outlet pipe 86. FIG. 13(b) shows the flow restriction valve in the closed position. Water will be retained in the storage space (either interior or external) up to the height of the flow weir 126 as shown in FIG. 13(b). FIGS. 14(a) and 14(b) depict an alternate embodiment, a weir gate 130 in the open position (FIG. 14(a) permitting water to flow from the underdrain channel 78 through the outlet pipe 86. FIG. 14(b) shows the closed position of the weir gate 130. Water will accumulate behind the gate to the height of the gate.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of controlling water flow in a wastewater treatment plant, the method comprising the steps of:
   (a) providing a trickling filter effluent water basin having filter media provided over a storage space for water and a means for controlling outlet flow from the basin; and
   (b) controlling outlet flow from the basin, thereby enabling the trickling filter effluent water basin to fill with water and store water, wherein the basin further includes a support platform containing filter media, the support platform positioned at a height above a base of the basin, and wherein the water basin is permitted to fill with water to a predetermined level below the height of the support platform containing the filter media.

2. The method of claim 1, wherein the water basin is used to store water during overflow events.

3. The method of claim 1, wherein in step (b) the water basin is permitted to fill with water by reducing the flow of water out of the basin after influent water has contacted filter media.

4. The method of claim 1, wherein the means for controlling flow is a flow weir in combination with a flow restriction valve.

5. The method of claim 1, wherein the means for controlling flow is a weir gate.

6. The method of claim 1, further comprising the step of releasing the stored water from the basin.

7. The method of claim 6, wherein the released water is further processed within the wastewater treatment plant.

8. The method of claim 7, wherein the further processing comprises any one or more of the steps of clarification, filtration and or disinfection.

* * * * *